Nov. 16, 1965   R. B. WADDELL, JR   3,218,210
METHOD OF MAKING REINFORCED FLEXIBLE HOSE
Original Filed Dec. 26, 1958   2 Sheets-Sheet 1

INVENTOR.
RUSSELL B. WADDELL JR.
BY
Reuben Wolk
ATTORNEY

INVENTOR.
RUSSELL B. WADDELL JR.
BY
ATTORNEY sembly of an outer tube upon the assembly of FIGURES 5 and 6.

United States Patent Office 3,218,210
Patented Nov. 16, 1965

3,218,210
METHOD OF MAKING REINFORCED FLEXIBLE HOSE
Russell B. Waddell, Jr., Waynesville, N.C., assignor to Dayco Corporation, a corporation of Ohio
Original application Dec. 26, 1958, Ser. No. 783,034, now Patent No. 3,091,261, dated May 28, 1963. Divided and this application June 29, 1962, Ser. No. 210,288
5 Claims. (Cl. 156—143)

This application is a division of U.S. application Serial No. 783,034, filed December 26, 1958, now Patent No. 3,091,261. This invention relates to a method of manufacturing flexible conduit for conveying fluid such as air, and more particularly to a conduit which is fluid impervious and contains radial reinforcement to withstand pressure and prevent collapse when used in vacuum systems, oxygen systems, respirating devices, and the like.

The type of conduit referred to herein usually comprises an elastomeric flexible tube which is reinforced against radial collapse by a reinforcing member comprising one or more axially spaced helical coils extending throughout its length, the detailed construction more fully described in United States patents issued to Rothermel et al.; No. 2,766,806, issued October 16, 1956; No. 2,782,-803, issued February 26, 1957; and No. 2,822,857, issued February 11, 1958. This type of hose has found wide acceptance in recent years and has replaced the somewhat more cumbersome designs because of its lightness, strength, and flexibility. The tube is sufficiently flexible to permit severe bending and yet is fluid impervious; at the same time the coil will prevent collapse of the tube without undue weight penalty. In the hose described above the outer tube may be made of such flexible thermoplastic material as polyvinyl chloride or polyethylene or blends thereof, or may be manufactured of natural or synthetic rubber materials or blends thereof, or blends of the plastics and rubbers. The reinforcing member described in the above patents is usually a spring steel which has been coated with a similar elastomeric material, but may also be of rigid plastic such as nylon.

The hose of the present invention represents an improvement over the prior art in providing a hose of the general type described above except that it has two or more reinforcing members, one of which is located on the interior of the tube or sheath and the other of which is located on the exterior of such tube. The coils of each member alternate in an axial direction. If desired, this assembly may be surmounted by an additional sheath. The resultant hose contains two separate reinforcing members which may provide the following advantages:

(1) An electrical circuit may be provided by the use of a double reinforcing member in the manner described in copending application Serial No. 745,398, filed June 30, 1958, now abandoned.

(2) A double reinforcing member will provide greater strength, particularly when high pressure hose is desired.

(3) It is possible to design a two-tube hose of the type generally described in copending application Serial No. 698,730, filed November 25, 1957, now Rothermel Patent No. 2,898,942, issued August 11, 1959, with additional advantages.

(4) Reduced air flow resistance occurs because of the fact that only half as many reinforcing turns are exposed on the interior than with a single reinforcement type hose.

(5) The tube of the hose is relatively non-collapsible because of the fact that it is held on both the interior and exterior by reinforcing coils.

As stated above, a two-wire hose system has great value in many designs, such as described in the aforementioned application Serial No. 745,398. In such a case, the reinforcing wire may be made of a material particularly suitable for the conduction of electrical current; for example, a copper core wire coated with steel, or a steel core wire coated with copper as described in the abovementioned application Serial No. 745,398; or other types of electrical wire may be used. Thus, the hose of the present invention, in addition to the other advantages it possesses, will be fully capable of performing this function. The exact manner by which two separate reinforcements are applied will be described further.

The advantages of dual tube hoses may also be realized where the alternative form of invention is utilized in which an outer sheath is pulled over the outer reinforcing coil. The use of two sheaths provides extra strength and abrasion resistance without the necessity of using a single tube of extra weight and thickness. A simplicity of construction is realized because the outermost sheath may be simply expanded and pulled over the assembly without the need for bonding by heat or adhesive. This permits the outer tube to be axially slidable and avoids excessive strain on the hose assembly. However, if a maximum of bonding is desired, adhesive or a solvent may be applied between the outer tube and the reinforcement.

The present invention also helps to eliminate an objection which has been made to the present type of hose in the past, namely, the exposing of the reinforcing coil on the inner surface of the hose which provides air resistance and may cause air turbulence and sound waves under high loads. An equivalent amount of support is provided in the present hose by reinforcing coils alternately spaced, but the fact that one of these coils is located on the outside of the inner tube results in an exposure at the inner surface of this inner tube of only half as many turns, thus automatically reducing the resistance to air flow. It is realized, of course, that it is possible to eliminate the exposed inner coils completely but for reasons of strength this may not be desirable in certain instances.

It is, therefore, a primary object of the present invention to provide a method of manufacturing a fluid-impervious non-collapsible flexible conduit which is reinforced against radial compression and collapse.

It is an additional object of this invention to provide such a conduit which provides optimum strength and reinforcement.

It is a further object of the invention to provide a hose having a comparatively smooth interior surface to permit free flow of fluid therein.

It is a further object of the invention to provide a novel hose having multiple tubes to improve abrasion resistance and flexing.

It is another object of the invention to provide a flexible conduit capable of conducting electrical current without additional wiring.

These and other objects will be apparent in the following specification, claims and drawings, in which:

Figure 1:
FIGURE 1 is an elevation of a section of reinforcing member suitable for use in the present invention.

Referring now to the drawings, FIGURE 1 illustrates an axially spaced helical reinforcing member 11, which is the conventional type of reinforcement such as described in the above-referenced patents and is preferably formed of a wire 12 coated uniformly with a flexible plastic material 12a formed into axially spaced helical coils. The wire 12 may, if desired, be a conductor type of wire, such as copper, steel coated with copper, or copper coated with steel as mentioned in the above copending applications. The exact method of forming this reinforcing member will not be described here as such method is described in full detail in the above-mentioned patents.

Figure 2:
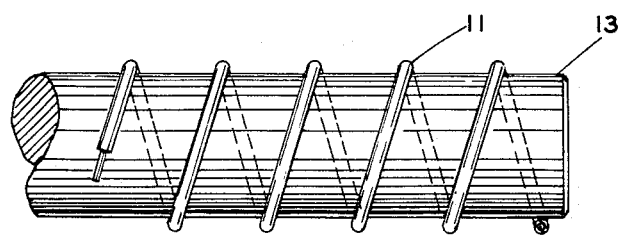
FIGURE 2 is an elevation of this member positioned on a building mandrel.

FIGURE 2 illustrates a mandrel 13 upon which the member 11 is mounted similarly to the method described in the above patents. As shown in this figure, the member is located so that the pitch of the spacing of the turns will remain approximately fixed in accordance with the original formation of the coils. This member is retained in place upon the mandrel by conventional means such as described in the above-referenced patents.

Figure 3:
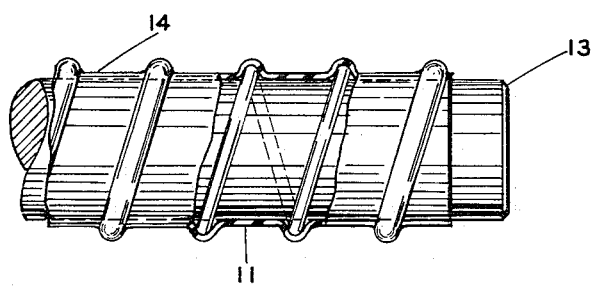
FIGURE 3 is an elevation of the first tube positioned upon said reinforcing member and mandrel.

It is next desired to place upon the member a tube 14 which is mounted in the position shown in FIGURE 3. This tube may be assembled by any of several methods described in the above-mentioned patents, but the exact method of mounting is not a subject of the present invention. As more fully described in the above-mentioned Patent No. 2,766,806 and shown in FIGURE 2 of that patent, the tube may be placed over a perforated hollow mandrel in which the interior is placed under a vacuum condition; the tube is softened at a temperature of about 300° F. so that when the vacuum is applied to the interior of the mandrel the differential pressure will tend to create a plastic flow of the tube which is radially inward. Alternatively, the method described in the above-mentioned Patent No. 2,822,857 and shown in FIGURE 3 of that patent may be utilized; in this case the tube is placed within the interior of a vacuum box, vacuum applied to the exterior surface so that it is expanded while the coil is placed inside the tube, then the vacuum released to drop the tube over the coil. The tube consists of an elastomeric material such as plastic, natural rubber, or synthetic rubber, or combinations thereof. As stated above, the plastic material may be any which will permit the proper flexibility and strength, as well as resistance to extreme temperature and abrasion. The preferred materials are polyvinyl chloride or polyethylene. Preferably, an adhesive, solvent, or other bonding means is placed on the crest only of the coils to provide a bond between the crest and the inner surface of the tube.

Figure 4:
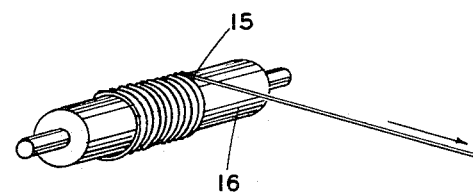
FIGURE 4 is a perspective view illustrating the assembly of a second reinforcing member upon the assembly of FIGURE 3.
Figure 4:
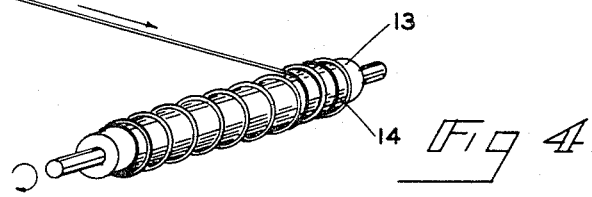

The next step of the construction is illustrated in FIGURE 4. As can be readily seen, the mandrel 13 containing the member 11 and the tube 14 is rotated in the direction shown by the arrow. At the same time, a second reinforcing member 15 is formed of the identical material used to form the member 11. This may be accomplished by any of several methods such as by mounting wire on a second mandrel 16 and passing it from this mandrel to the mandrel 13. The wire is wound so that the member 15 is formed on the outside of the tube 14 with its turns alternately spaced in an axial direction with the turns of the member 11. If desired, an adhesive or solvent may be applied to the tube 14 at the point where the inner periphery of the turns of member 15 contact this tube in order to improve the bonding between these members. It may be necessary to impart a radially inward force to the coils of member 15 and this may be accomplished by making the coils of slightly smaller diameter than that of the mandrel 13 prior to winding them upon this mandrel. The above method is only one of several that might be used to form the member 15. For example, it may be installed by making it larger in diameter than the mandrel, sliding it over the first member until its turns are in proper alternating relationship with the coils of member 11, and then forcing the coils of member 15 down against the mandrel by means of a pressure roller.

Figure 5:
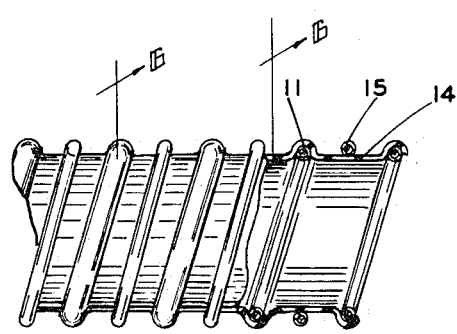
FIGURE 5 is an elevation partially in section illustrating the relationship of the members and the tube.
Figure 6:
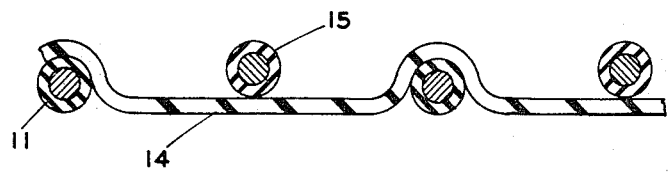
FIGURE 6 is a sectional view taken along lines 6—6 of FIGURE 5 further illustrating the relationship between the two reinforcing members and the inner tube.

Whichever method is used, the structure resulting from this step is illustrated in FIGURES 5 and 6 indicating a tube which has been removed from the mandrel. As can be seen, this assembly can be considered a finished conduit, if desired, and consists of a tube 14 having alternating reinforcing members 11 and 15 on the inner and outer surfaces thereof, the coils of each of these reinforcing members being axially interspersed or alternated. The outer surface of the assembly is a tube which is corrugated where it envelopes the inner reinforcing member, and depends between the coils of this member extending to approximately the plane of the inner surface of the coils. The corrugations are bonded to the crest or outer portion of these coils while embracing part of the coils in unbonded state, and the tube is bonded between corrugations to the crest or inner portion of the outer member 15.

Figure 7:
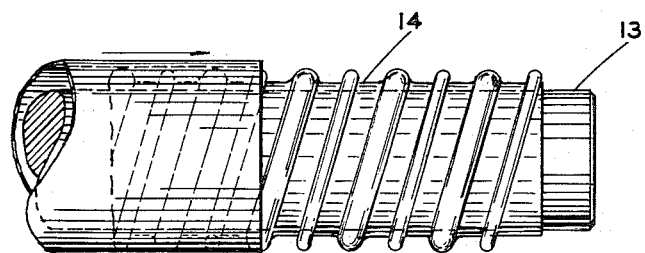
FIGURE 7 is an elevational view illustrating the assembly of an outer tube upon the assembly of FIGURES 5 and 6.
Figure 8:
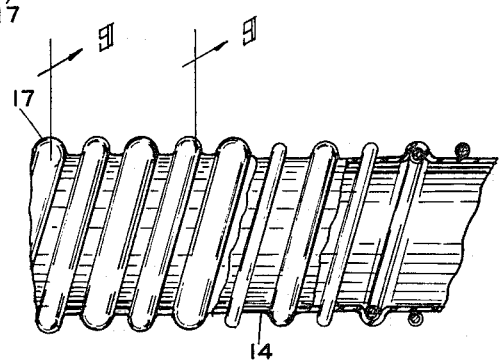
FIGURE 8 is an elevation partially in section illustrating the relationship of a modified form of the invention after removal from the mandrel.
Figure 9:
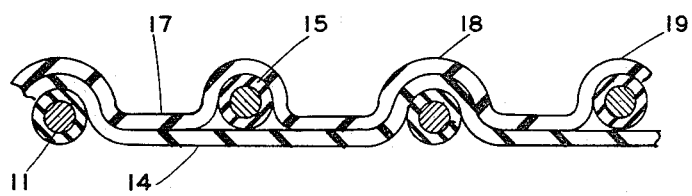
FIGURE 9 is a sectional view taken along lines 9—9 of FIGURE 8 further illustrating the relationship of the two reinforcing members and the two tubes of the modified form of the invention.

Instead of a finished product as shown in FIGURE 5, it may be desired to add another tube to this assembly in order to conceal the outer reinforcing member 15. This may be done as shown in FIGURE 7 in which it is only necessary to add the tube or sheath 17 by the same technique used in connection with the installation of the tube 14. More specifically the technique described in the above-referenced Patent No. 2,782,803 may be utilized in which the tube 17 is heat softened and a differential pressure is created between the exterior and the interior of the mandrel 13; the external pressure is greater and thus forces the heat softened tube inwardly over the outer reinforcing member 15 as well as the inner tube 14, thus creating corrugations which correspond to the coils of both reinforcing members 11 and 15. An alternative technique, which is described in the above-mentioned Patent No. 2,822,857, consists of placing the outer tube 17 within a vacuum box and expanding it outwardly so that the remaining assembly may be inserted within it. Release of the vacuum permits the tube 17 to snap back inwardly and tends to achieve the original diameter of the tube prior to its expansion. This likewise will result in forcing the tube 17 over the outer reinforcing member 15 and the inner tube 14, thereby creating corrugations which correspond to the coils of both reinforcing members 11 and 15. The tube is applied with or without adhesive and results in a conduit illustrated in FIGURES 8 to 10. As can be seen in these figures, the resulting conduit consists of an inner reinforcing member 11 having a tube 14 thereon, an outer reinforcing member 15 mounted on the tube 14 and having its coils alternating in an axial direction with the coils of member 11, and an outer tube 17 mounted so that it attains a corrugated shape. These corrugations as shown in FIGURE 9 will appear the same from the outside. However, it is noticed from viewing this figure that the corrugation 18 in tube 17 is formed by immediate contact with a corresponding corrugation in the tube 14; while the corrugation 19 is formed by contact with the coils of outer reinforcing member 15. Thus, corrugations are formed over each coil of both members 11 and 15. It will be noted that in order to maintain a constant outer diameter of the finished conduit, the coils of the outer member 15 have an inner diameter which is identical to the outside diameter of the inner tube 14. Stated another way, the outer coils have an inner diameter which exceeds the inner diameter of the inner coils by an amount equal to twice the thickness of the inner tube 14. Of course, it must be realized that it is not necessary for the conduit to have a constant outer diameter; for example, the two reinforcing members may have a diametric relationship so that the diameter of the conduit at the corrugation 19 is smaller than the corrugation 18.

The product which results from the above construction will be a highly flexible conduit which is extremely resistant to abrasion and when relaxed will assume the configuration shown in FIGURE 9. Upon bending or stretching the conduit, however, it will appear more like the section of FIGURE 10 in which it can be readily seen that the inner tube 14 is capable of stretching sufficiently to cause the sections of this tube to assume a long, flat arc between the turns of the reinforcing member 11 over which it passes, while at the same time it is only slightly restricted in its stretch by virtue of the attachment of the member 15 to its outer surface. The conduit produced in accordance with this invention may be used for the sole purpose of conveying fluids, or may have the additional function of conducting an electrical circuit in a device such as a vacuum cleaner by an attachment such as described in United States Patent No. 2,769,997, or as described in the above-mentioned copending applications.

Figure 10:
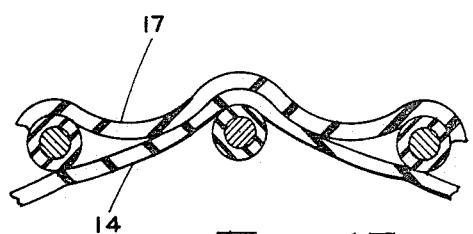
FIGURE 10 is a view similar to FIGURE 9 illustrating the relationship of the elements of FIGURE 9 when the hose is in stretched position.

In comparing FIGURES 9 and 10 it should be particularly noted that the inner tube envelops about one-half the periphery of the inner coils while at rest (FIGURE 9). However, upon stretching or bending the tube as in FIGURE 10, it is seen that only the crest portion of the tube and reinforcing member which are in contact at rest are truly bonded and remain in contact during the stretch. This is because the adhesive has been applied at only the outermost or innermost portions of the coils.

Although the invention describes a double reinforcing member capable of use as a dual reinforcement or two-wire electrical system, it is entirely within the scope of this invention that three, four or more reinforcing coils may be used if desired. This may be accomplished by altering the original spacing of each of the coils if desired. A third reinforcing member could then be mounted on the outer surface of the tube 17 interspersed in an axial direction between adjacent coils of the members 11 and 15, and another tube drawn over this reinforcement. Other modifications in the construction and materials used may be made without departing from the scope of this invention.

I claim:

1. A method of manufacturing a reinforced flexible conduit comprising the steps of forming first and second circumferential reinforcing members having axially spaced helical coils, forming first and second tubes of flexible elastomeric material, inserting said first member within said first tube, surrounding said first tube with said second member, and forcing said second tube over said second member and said first tube to form corrugations corresponding to the coils of both members.

2. The method of claim 1 including the step of axially interspersing the coils of said first and second reinforcing members.

3. The method of claim 1 including the step of bonding said first tube to said reinforcing members.

4. The method of claim 1 including the steps of bonding said first tube to both of said reinforcing members and bonding said second tube to said second member.

5. A method of manufacturing a reinforced flexible conduit comprising the steps of forming first and second circumferential reinforcing members having axially spaced plastic-coated helical coils, forming first and second tubes of elastomeric material, embracing the coils of said first member with said first tube and bonding said tube to the crests of the embraced coils, surrounding and bonding said first tube with the coils of said second member, while axially alternating the coils of said first and second member, and forcing said second tube over said second member and said first tube to form corrugations corresponding to the coils of both members.

References Cited by the Examiner

UNITED STATES PATENTS

| 2,943,644 | 7/1960 | Moseley | 156—143 XR |
| 2,949,133 | 8/1960 | Rothermel et al. | 156—144 |

FOREIGN PATENTS

| 833,477 | 7/1938 | France. |
| 627,201 | 8/1949 | Great Britain. |
| 588,858 | 6/1947 | Great Britain. |
| 10,921 | 1902 | Great Britain. |

EARL M. BERGERT, *Primary Examiner.*